(12) United States Patent
Song (10) Patent No.: US 7,483,345 B2
(45) Date of Patent: Jan. 27, 2009

(54) OPTICAL PICKUP APPARATUS CAPABLE OF COMPENSATING THICKNESS DEVIATION OF OPTICAL RECORDING MEDIA

(76) Inventor: Tae-Sun Song, 305-65, Kwangmyung-dong, Kwangmyung-city, Kyung-ki-do (KR) 423-804

( * ) Notice: Subject to any disclaimer, the term of this patent is extended or adjusted under 35 U.S.C. 154(b) by 741 days.

(21) Appl. No.: 10/505,470

(22) PCT Filed: Feb. 20, 2003

(86) PCT No.: PCT/KR03/00350

§ 371 (c)(1),
(2), (4) Date: Aug. 20, 2004

(87) PCT Pub. No.: WO03/071527

PCT Pub. Date: Aug. 28, 2003

(65) Prior Publication Data

US 2005/0111312 A1    May 26, 2005

(30) Foreign Application Priority Data

Feb. 25, 2002   (KR) .................. 10-2002-0009877

(51) Int. Cl.
*G11B 7/00* (2006.01)

(52) U.S. Cl. .............. 369/44.23; 369/44.28; 369/44.11; 369/112.23

(58) Field of Classification Search .............. 369/53.23, 369/112.23
See application file for complete search history.

(56) References Cited

U.S. PATENT DOCUMENTS

| | | | |
|---|---|---|---|
| 4,475,179 A | 10/1984 | Geyer | 365/215 |
| 4,797,545 A | 1/1989 | Shikama et al. | 250/201 |
| 5,125,750 A * | 6/1992 | Corle et al. | 359/819 |
| 5,623,138 A | 4/1997 | Lee | |
| 5,703,856 A * | 12/1997 | Hayashi et al. | 369/53.2 |

(Continued)

FOREIGN PATENT DOCUMENTS

| | | |
|---|---|---|
| EP | 1 031 976 | 8/2000 |
| EP | 1 041 545 A1 | 10/2000 |
| EP | 1 052 627 A1 | 11/2000 |
| EP | 1 130 440 A2 | 9/2001 |
| EP | 1 130 440 A3 | 9/2001 |

(Continued)

OTHER PUBLICATIONS

International Search Report in PCT/KR03/00350 dated Jun. 4, 2003.
Supplementary European Search Report for Application No. 03708679.0, dated Mar. 19, 2008.

*Primary Examiner*—Muhammad N. Edun
(74) *Attorney, Agent, or Firm*—Marshall, Gerstein & Borun LLP (57) ABSTRACT

An optical pickup apparatus capable of compensating for a thickness deviation of a high-density optical recording medium is disclosed. The optical pickup apparatus has a light source, a collimator lens, a beamsplitter, and an objective lens system comprising a solid immersion lens which has a planar surface facing the substrate of the optical recording medium. The optical pickup apparatus has a position adjustment unit connected to the light source or the collimated lens, mating the light source or the collimated lens shift according to a focus control signal generated from the focus control unit. Further, a finite optical pickup apparatus in which a collimator lens is not used has a position adjustment unit connected to the light source, making the light source shift according to the focus control signal.

11 Claims, 5 Drawing Sheets

U.S. PATENT DOCUMENTS

| | | | |
|---|---|---|---|
| 5,936,928 A | 8/1999 | Jain et al. | |
| 5,995,292 A * | 11/1999 | McDonald | 359/637 |
| 6,097,688 A * | 8/2000 | Ichimura et al. | 369/112.24 |
| 6,108,139 A | 8/2000 | Takahashi | 359/719 |
| 6,115,347 A * | 9/2000 | Ichimura et al. | 369/112.24 |
| 6,151,174 A * | 11/2000 | Hendriks | 369/53.19 |
| 6,192,022 B1 | 2/2001 | Hendriks et al. | 369/112 |
| 6,353,582 B1 * | 3/2002 | Kikuchi | 369/44.23 |
| 6,498,776 B1 * | 12/2002 | Nakano et al. | 369/112.23 |
| 6,577,575 B2 * | 6/2003 | Novotny et al. | 369/71 |
| 6,657,927 B1 | 12/2003 | Awano et al. | 369/13.23 |
| 6,680,893 B2 * | 1/2004 | Ikegame | 369/112.01 |
| 7,042,826 B2 * | 5/2006 | Matsui | 369/112.24 |

FOREIGN PATENT DOCUMENTS

| | | |
|---|---|---|
| EP | 1 244 102 A2 | 9/2002 |
| JP | 8-221790 | 8/1996 |
| JP | 11-259906 | 9/1999 |
| JP | 2000-113499 | 4/2000 |
| JP | 2000-200434 | 7/2000 |
| JP | 2000-242963 | 8/2000 |
| JP | 2001-23182 | 1/2001 |
| JP | 2002-279680 | 9/2002 |
| KR | 2002-0037638 | 5/2002 |
| KR | 2002-0038444 | 5/2002 |
| KR | 2002-0093287 | 12/2002 |
| WO | WO 01/45098 | 6/2001 |

* cited by examiner

OPTICAL PICKUP APPARATUS CAPABLE OF COMPENSATING THICKNESS DEVIATION OF OPTICAL RECORDING MEDIA

BACKGROUND OF THE INVENTION (a) Field of the Invention

The present invention relates to an optical pickup apparatus capable of compensating for a thickness deviation of an optical recording media, and more particularly, to an optical pickup apparatus capable of compensating for a thickness deviation of the media, which is for near-field recording/reproducing, by using a solid immersion lens (SIL).

(b) Description of the Related Art

Recently, optical recording media such as optical and magneto-optical discs have been developed to have high-density storage, to be used for computer storage, package media for music and images, and so forth. In order to obtain high-density storage, it is desirable to reduce the light spot size of an optical pickup apparatus.

The light spot size is proportional to the wavelength of the light, and inversely proportional to the numerical aperture of an objective lens system. Therefore, many proposals to reduce the wavelength of the light as well as to increase the numerical aperture of the objective lens system have been suggested.

In order to increase the numeral aperture of the objective lens system, many optical pickup apparatuses have been developed using SILs which are nearly in contact with a signal recording surface of an optical disc. However, the SILs may collide with the optical disc, thereby allowing destruction of the signal recording surface due to rubbing or abrasion. Further, it is highly possible for the apparatus or the optical disc to suffer chemical or physical deformation due to high heat caused by light spot radiation.

In order to overcome the above drawbacks, optical pickup apparatuses that collect light from a signal recording surface through a substrate of an optical recording medium has been proposed in Japanese Laid-open Publication No. JP8-221790 and Korean Laid-open Publication No. 2002-0093287. In this type of optical pickup apparatus, since light is focused on the signal recording surface through the substrate of the optical disc by the SIL, it is necessary to compensate for thickness deviations of the substrate of the optical disc which likely result during the manufacturing process of the disc.

Thickness deviations of the optical disc are common. However, if a SIL is shifted for focus control in a pickup apparatus in which a light spot is focused by the SIL through a substrate of the optical disc, the optical energy changes such that near-field recording/reproducing becomes impossible.

The SIL cannot be shifted toward the signal recording surface when the optical disc has a thickness greater than a standard thickness. Further, the SIL cannot be shifted against the signal recording surface at a thinner area because an air gap must be properly maintained during near-field recording/reproducing. That is, since the thickness deviations of optical discs are relatively larger than the air gap of 100 nm, they cannot be compensated for by an adjustment of the air gap between the SIL and the disc.

Further, depth of focus is proportional to a wavelength of the light source, and inversely proportional to a square of the numerical aperture of a SIL or an objective lens system, which is defined as follows:

$$\text{Depth of Focus} = \lambda/(2 \times NA^2)$$

where $\lambda$ represents a wavelength of light, and NA represents a numerical aperture.

Therefore, when a numerical aperture of the objective lens system is 1.2 and a wavelength of the light is 650 nm, the depth of focus is a value of 225 nm, which is very short. Due to the very short depth of focus, the pickup apparatus may not approach the optical diffraction limit properly, with respect to the thickness deviation of the substrate.

Accordingly, focus controls are not accomplished by an adjustment of position of a SIL in near-field recording/reproducing, in principle, and the thickness deviation is not compensated for by adjustment of the air gap, especially in substrate-through recording/reproducing, because the SIL should always be nearly in contact with the disc.

SUMMARY OF THE INVENTION

In view of the prior art described above, it is an object of the present invention to provide an optical pickup apparatus capable of compensating for deviations of optical thickness (optical path length) due to physical thickness variation or index variation of the substrate of the optical recording media, to form a light spot exactly on the signal recording surface of the media.

To achieve the above and other objects, as embodied and broadly described herein, the invention comprises:

a light source generating and emitting light beams;

a collimator lens collimating the emitted light beams from the light source into collimated beams;

a beamsplitter enabling a part of the collimated beams to pass therethrough;

an objective lens system, placed on an optical path between the beamsplitter and the optical recording medium, focusing the collimated beams from the beamsplitter, the objective lens system comprising a solid immersion lens which has a planar surface facing the substrate of the optical recording medium;

a light-receiving module receiving the light beam reflected from the optical recording medium and converting it into electrical signals;

a focus control unit generating a focus control signal for focus control, in response to the electric signal from the light-receiving module; and a position adjustment unit, connected to the light source or the collimated lens, making the light source or the collimated lens shift in response to the focus control signal generated from the focus control unit, thereby compensating for thickness deviation of the optical recording media.

According to another aspect of the present invention, an optical pickup apparatus capable of compensating for thickness deviation of a high-density optical recording medium comprises:

a light source generating and emitting light beams;

a beamsplitter enabling a part of the emitted light beams to pass therethrough;

an objective lens system, placed on an optical path between the beamsplitter and the optical recording medium, focusing the light beams from the beamsplitter, the objective lens system comprising a solid immersion lens which has a planar surface facing the substrate of the optical recording medium;

a light-receiving module receiving the light beam reflected from the optical recording medium and converting it into electrical signals;

a focus control unit generating a focus control signal for focus control, in response to the electric signal from the light-receiving module; and a position adjustment unit, connected to the light source, making the light source shift in response to the focus control signal generated from the focus control unit.

DETAILED DESCRIPTION OF THE PREFERRED EMBODIMENTS

The present invention will be described in detail with reference to the accompanying drawings. The present invention is intended to read or write information on various optical recording media such as compact discs (CDs), digital versatile discs (DVDs), mini discs (MDs), and magneto-optical discs, but it will be explained for an optical pickup apparatus for reading information from a high density optical disc on which information has already been written, for the purpose of easy explanation.

Figure 1:
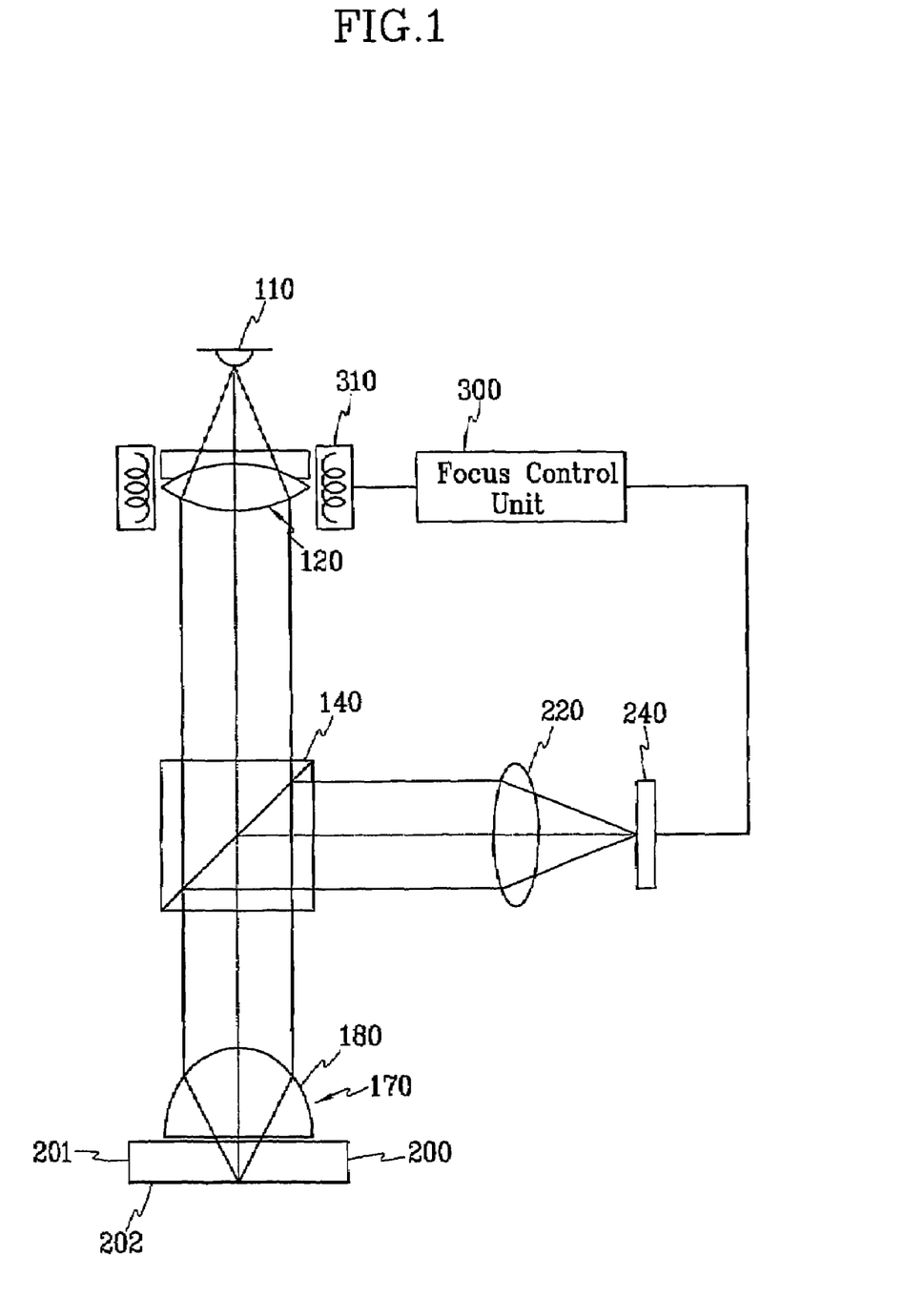
FIG. 1 shows a first preferred embodiment of the present invention.
Figure 2:
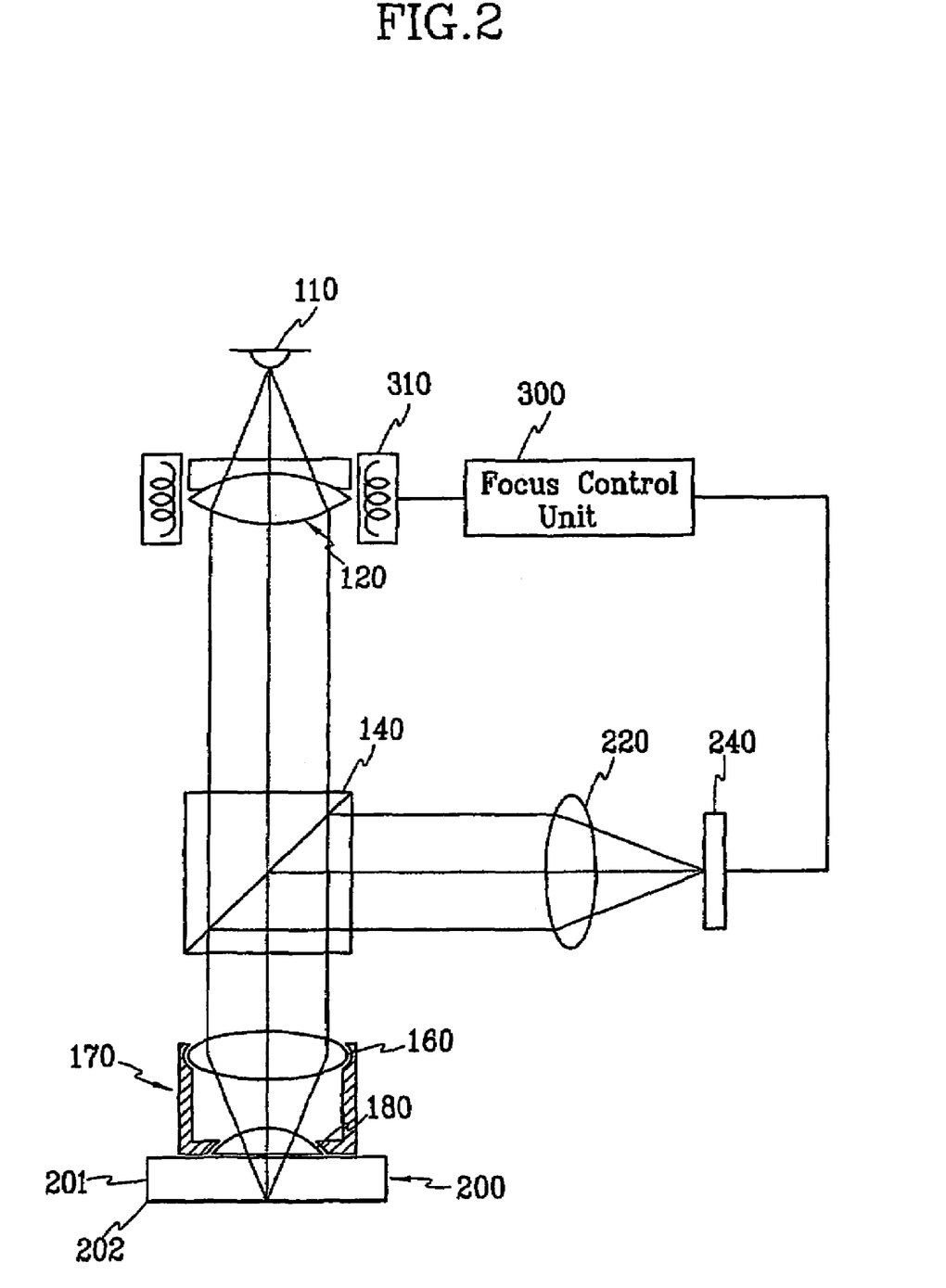
FIG. 2 illustrates the first preferred embodiment having an objective lens system composed of a condenser objective lens and a solid immersion lens (SIL)

Referring first to FIGS. 1 and 2, an optical pickup apparatus according to the first preferred embodiment of the present invention will be explained. The optical pickup apparatus has a light source 110 of a laser diode, a collimator lens 120, a beamsplitter 140, a sensor lens 220 and photodetector 240. Light beams which are emitted from the light source 110 are collimated by the collimator lens 120.

A solid immersion lens (SIL) 180, which is nearly in contact with an optical disc 200, is employed as an objective lens system 170 in the apparatus of FIG. 1, in order to condense the collimated beam on a signal recording surface 202 of the optical disc 200. The SIL 180 has a planar surface facing the substrate 201 of the optical disc 200 and a convex surface toward the light source.

It is possible to form an objective lens system 170 having a condenser objective lens 160 and a SIL 180 as shown in FIG. 2, instead of a single SIL as in FIG. 1.

The collimator lens 120 is connected with a position adjustment unit 310, which is connected to a focus control unit 300. The focus control unit 300 generates a focus control signal to the position adjustment unit 310 in response to signals generated from the photodetector 240. The position adjustment unit 310 causes the collimator lens 120 to shift, resulting in focus control to remove defocus due to the thickness deviation of the optical disc. The position adjustment unit 310 may be embodied by known precise movement devices such as piezoelectric devices, moving magnets, or moving coils to move the collimator lens precisely.

Although the position adjustment unit 310 is figured to be connected with the collimator lens 120 to adjust the position of the collimator lens, it is possible to connect it with the light source 110 to compensate for the thickness deviations of the optical disc.

The focus control unit 300 detects focus errors by a conventional focus error detection method such as beam size detection, astigmatism detection, knife-edge detection, hologram-Foucault detection, and so forth. The photodetector 240 may be suitably divided into several regions according to the focus error detection method.

The operation of the optical pickup of the first preferred embodiment will now be described. The light source 110 of a laser diode generates laser beams, which pass though the collimator lens 120 to become collimated beams. The collimated beams pass through the beamsplitter 140 and then enter the SIL 180 of the objective lens system 170 and the substrate 201 of the optical disc, to be focused on the signal recording surface 202 of the optical disc 200. Then, the focused light on the signal recording surface 202 diffracts or reflects from the surface 202, passes through the SIL 180 of the objective lens system 170, and then enters the beamsplitter 140 retroreflectively. The light is reflected from the beamsplitter 140, enters the sensor lens 220, and then enters the photodetector. 240. The photodetector 240 demodulates the incident light and reproduces information signals.

The SIL 180 is nearly in contact with the optical disc 200, so that an air gap between the SIL 180 and the disc 200 may be normally maintained by conventional holding apparatuses at about 100 nm, which is an order of magnitude of the wavelength of the light source that keeps it within the near-field effect range.

Figure 3:
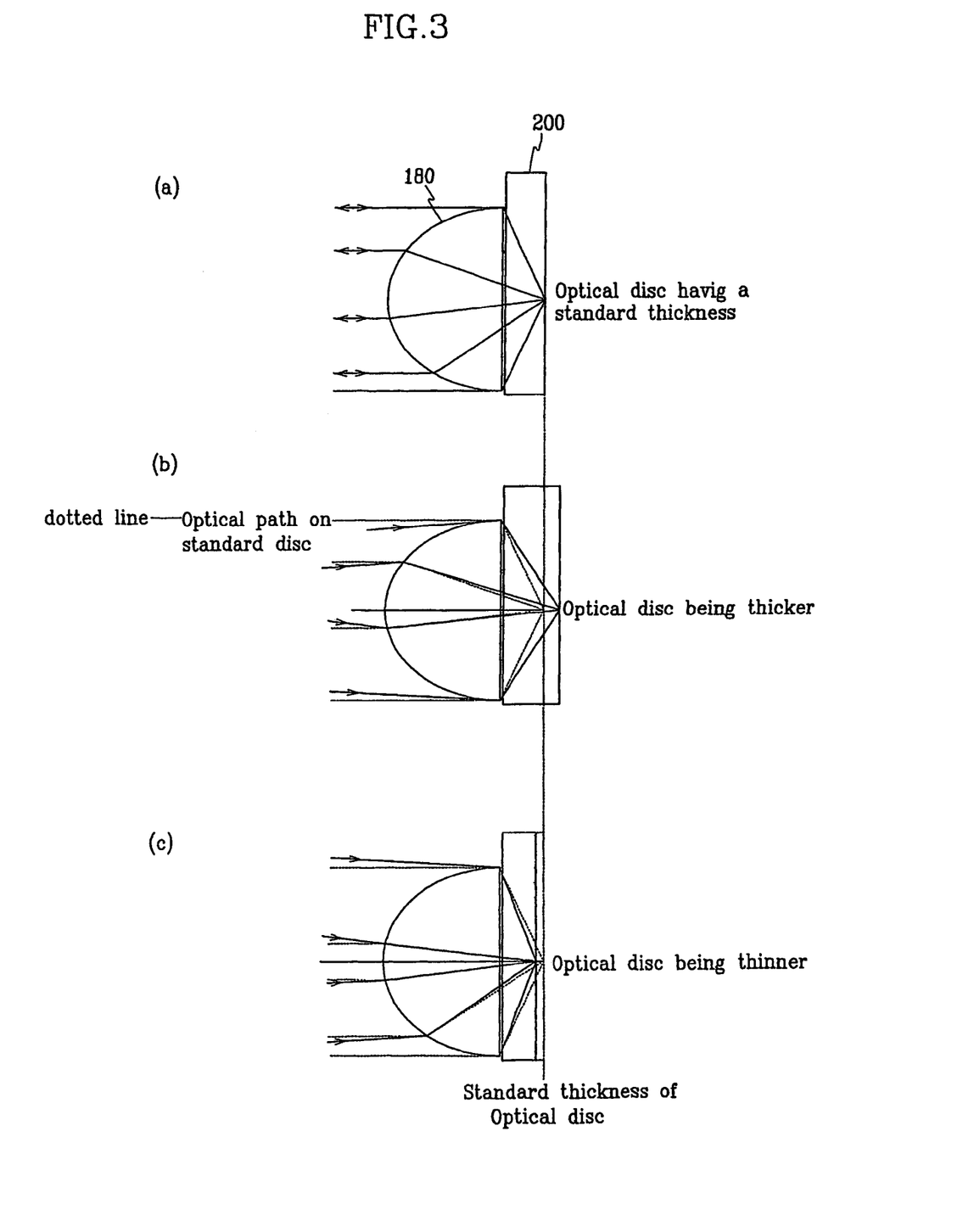
FIG. 3 illustrates optical paths of ideal incident rays according to thickness deviations of optical discs.

When the optical disc 200 is maintained at a normal air gap with the SIL1 80 and has a standard thickness, a light spot is exactly focused on the signal recording surface 202 of the disc (See FIG. 3(a)). When the disc is thicker than the standard thickness, the focus control unit 300 generates a focus control signal to shift the collimator lens 120 toward the light source 110 (See FIG. 3(b)), and when the disc is thinner than the standard thickness, the focus control unit 300 generates a focus control signal to shift the collimator lens 120 away from the light source 110 (See FIG. 3(c)), in order to compensate for thickness deviation of the optical disr.

The shift amount L of the collimator lens 120 or light source 110 is as follows:

$$L \sim (f1/f2)^2 \times (\Delta d/n)$$

where $\Delta d$ represents the deviation in the optical thickness of the substrate of the optical disc;

n represents a refractive index of the substrate; and f1 and f2 represent focal lengths of the collimated lens and the objective lens system, respectively.

For example, when the ratio f1/f2 is 10, that is, the focal lengths of collimator lens 120 and objective lens system 170 are 10 mm and 1 mm, respectively, the standard thickness of the optical disc is 0.1 mm, the thickness deviation $\Delta d$ is 1 µm, and the refractive index n of the substrate is 1.57, the shift amount L between the collimator lens 120 and the light source 110 becomes about 64 µm. Accordingly, when the thickness deviation of the substrate of the optical disc amounts about 2 µm, it may be compensated for by varying the distance between the collimator lens 120 and the light source 110 by about 128 µm, resulting in exact focus on the signal recording surface in spite of the thickness deviation of the substrate.

Figure 4:
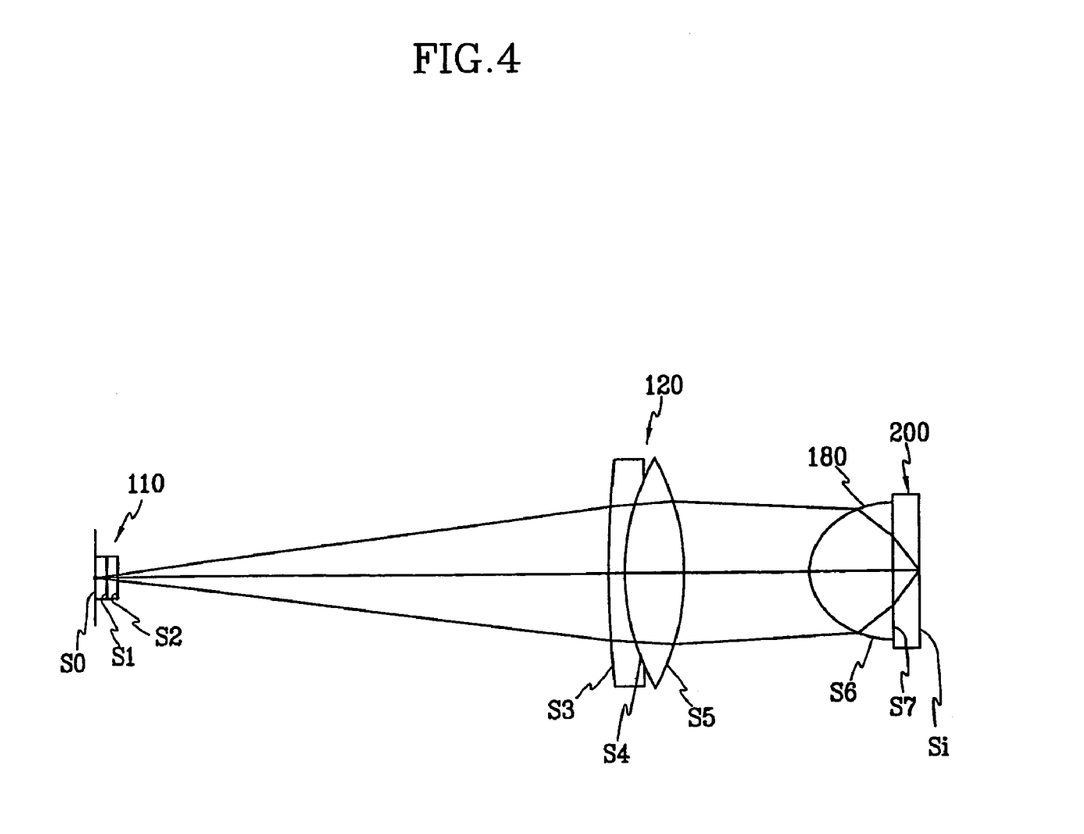
FIG. 4 illustrates an optical pickup apparatus of Table 1.

Table 1 and FIG. 4 show an example of an optical pickup apparatus having a doublet collimator lens 120 and an objective lens of a single aspherical SIL.

TABLE 1

| Surface | Radius of curvature (mm) | Thickness or distance (mm) | Material (refractive index) |
|---|---|---|---|
| s0 | ∞ | 0.1 | air (1.0) |
| s1 | ∞ | 0.25 | BK7 (1.514) |
| s2 | ∞ | 11.945 | air (1.0) |
| s3 | 32.0311 | 0.3293 | SF1 (1.71) |
| s4 | 5.927 | 1.4491 | BSM24 (1.614) |
| s5 | −6.09280 | 3.0 | air (1.0) |
| s6 | 1.36399 | 2.0 | GD (1.91) |
| | aspherical coefficients | | |
| | K: −0.854874 | | |
| | A: 0.287815E−01 | | |
| | B: 0.883859E−02 | | |
| | C: −.138755E−02 | | |
| | D: 0.278867E−02 | | |
| | E: −.115832E−02 | | |
| | F: 0.740425E−03 | | |
| | G: −.319108E−03 | | |
| | H: 0.726333E−04 | | |
| s7 | ∞ | 0.6 | PC (1.5785) |
| Si | ∞ | 0.0 | |

In the optical pickup apparatus of Table 1 and FIG. 4, the distance between the light source and the collimator lens becomes 11.8777 mm, which is about 67 μm shorter than the normal distance, when the disc is 1 μm thicker than the standard thickness. The distance between the light source and the collimator lens becomes 12.0135 mm, which is about 68 μm longer than the normal distance, when the disc is 1 μm thinner than the standard thickness. Further, it is noted that the apparatus may depart far away from the diffraction limit of the entire optical system when the thickness deviation is in excess of 3 μm from the standard thickness. In the case that considerable thickness deviations of the optical disc exist, it is possible to broaden the range that satisfies the diffraction limit performance by means of improving the shape of the SIL and/or collimator lens. In practice, when the thickness of the substrate of the optical disc is 0.1 mm, the current manufacturing techniques enable optical discs to be manufactured within a thickness deviation of ±1 μm. Although other components are considered to have some manufacturing tolerances, it is possible to reach a diffraction limit performance by means of a triplet collimator lens, an aspherical doublet SIL, or a graded index lens (GRIN lens) type SIL, with or without a condenser objective lens.

In order to compensate for a thickness deviation of an optical disc, it is possible to change not only a physical distance, but also an optical distance between the light source and collimator lens, such as by placing between the light source and collimator lens a material whose refractive index is changed under external electric fields (e.g., liquid crystals having linear electro-optical effects) or according to external light intensity (e.g., liquid crystals having photorefractive effects).

Figure 5:
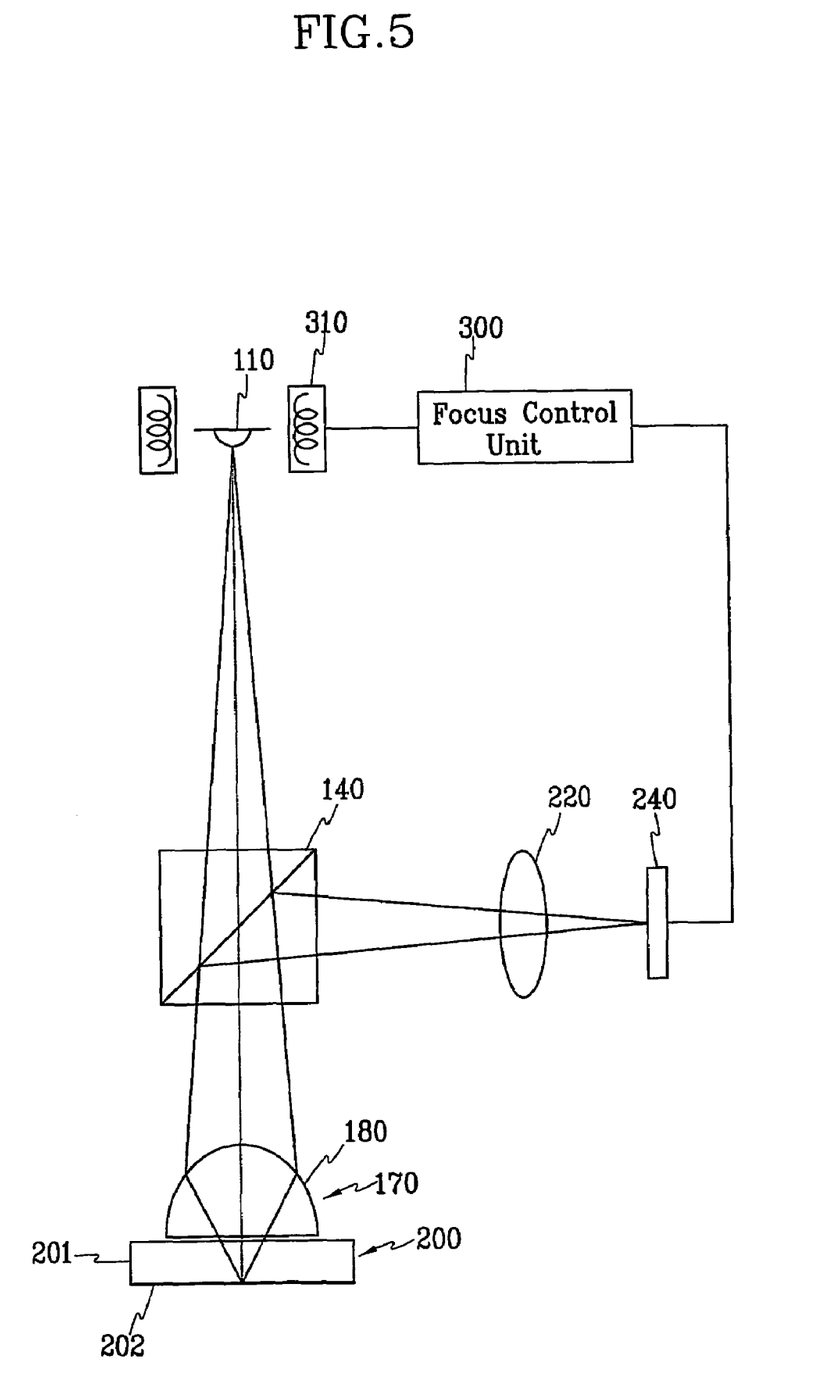
FIG. 5 shows a second preferred embodiment of the present invention.

Referring next to FIG. 5, an optical pickup apparatus according to the second preferred embodiment of the present invention will be explained. The optical pickup apparatus according to the second preferred embodiment is similar to that of the first preferred embodiment, except that the apparatus is a kind of finite optical system without a collimator lens. The apparatus has a light source 110 of a laser diode, a beamsplitter 140, a sensor lens 220, and a photodetector 240.

A solid immersion lens (SIL) 180, which is nearly in contact with an optical disc 200, is employed as an objective lens system 170 in the apparatus of FIG. 5, in order to condense the diverging beam emitted from the light source on a signal recording surface 202 of the optical disc 200. The SIL 180 has a planar surface facing the substrate 201 of the optical disc 200, and a convex surface toward the light source.

Although FIG. 5 shows the single SIL 180 as an objective lens system 170, it is also possible to form an objective lens system having a condenser objective lens and a SIL as is in the first preferred embodiment as shown in FIG. 2.

The light source 110 is connected with a position adjustment unit 310, which is connected to a focus control unit 300. The focus control unit 300 generates a focus control signal to the position adjustment unit 310 in response to signals generated from the photodetector 240. The position adjustment unit 310 causes the light source 110 to shift, resulting in focus control to remove defocus due to the thickness deviation of the optical disc. The position adjustment unit 310 may be embodied by known precise movement devices such as piezoelectric devices, moving magnets, or moving coils to move the collimator lens precisely.

The focus control unit 300 detects focus errors by a conventional focus error detection method such as beam size detection, astigmatism detection, knife-edge detection, hologram-Foucault detection, and so forth. The photodetector 240 may be suitably divided into several regions according to the focus error detection method.

The operation of the optical pickup of the second preferred embodiment will now be described. The light source 110 of a laser diode generates divergent laser beams, which pass through the beamsplitter 140 and then enter the SIL 180 of the objective lens system 170 and the substrate 201 of the optical disc, to be focused on the signal recording surface 202 of the optical disc 200. Then, the focused light on the signal recording surface 202 diffracts or reflects from the surface 202, passes through the SIL 180 of the objective lens system 170, and then enters the beamsplitter 140 retroreflectively. The light is reflected from the beamsplitter 140, enters the sensor lens 220, and then enters the photodetector 240. The photodetector 240 demodulates the incident light and reproduces information signals.

The SIL 180 is nearly in contact with the optical disc 200, so that an air gap between the SIL 180 and the disc 200 may be normally maintained by conventional holding apparatuses at about 100 nm, which is an order of magnitude of the wavelength of the light source that keeps it within the near-field effect range.

When the optical disc 200 is maintained at a normal air gap with the SIL 180 and has a standard thickness, a light spot is exactly focused on the signal recording surface 202 of the disc. In the case in which the disc is thicker than the standard thickness, the focus control unit 300 generates a focus control signal to shift the light source 110 toward the disc 200, and when the disc is thinner than the standard thickness, the focus serve unit 300 generates a focus control signal to shift the light source 110 away from the disc 200, resulting in compensating for thickness deviation of the optical disc.

The shift amount L2 of the light source 110 is as follows:

$$L2 \sim (s1/s2)^2 \times (\Delta d/n)$$

where Δd represents the deviation in the optical thickness of the substrate of the optical recording medium;
n represents a refractive index of the substrate;
s1 represents an optical path length between the light source and the solid immersion lens; and
s2 represents an optical path length between the solid immersion lens and the optical recording medium.

Although it has been explained in the second preferred embodiment that the position adjustment unit 310 is connected to the light source, it is possible to displace an additional lens, for example, a coupling lens that enables changing a part of the optical power of the objective lens system, and connecting the position adjustment unit 310 to the coupling lens, instead of the light source.

Further, it is clear that the present invention may be applied not only to physical thickness deviations of the disc, but also to optical thickness deviations in the disc due to variation of the refractive index of the substrate.

Therefore, an optical pickup apparatus according to the present invention is capable of correcting focus errors which may occur because of variations in physical and/or optical thickness of the optical recording medium when recording and/or reproducing data.

It will be apparent to those skilled in the art that various modifications and variations can be made to the apparatus of the present invention without departing from the spirit and scope of the invention. The present invention covers modifications and variations of this invention, provided they come within the scope of the appended claims and their equivalents.

What is claimed is:

1. An optical pickup apparatus capable of compensating for thickness deviation of a high-density optical recording medium, the optical pickup apparatus recording or reproducing data from the optical recording medium that has a signal recording surface on a substrate, comprising:
   a light source generating and emitting light beams;
   a collimator lens collimating the emitted light beams from the light source into collimated beams;
   a beamsplitter enabling a part of the collimated beams to pass therethrough;
   an objective lens system, placed on an optical path between the beamsplitter and the optical recording medium, focusing the collimated beams from the beamsplitter, the objective lens system comprising a solid immersion lens which has a planar surface facing the substrate of the optical recording medium, with the substrate being interposed between the planar surface of the solid immersion lens and the signal recording surface;
   a light-receiving module receiving the light beam reflected from the optical recording medium and converting it into electrical signals;
   a focus control unit generating a focus control signal for focus control, in response to the electric signal from the light-receiving module;
   a position adjustment unit, connected to the light source or the collimated lens, making the light source or the collimated lens shift in response to the focus control signal generated from the focus control unit; and,
   an air gap control unit for maintaining a distance between the solid immersion lens and the optical recording medium, independent from the focus control signal generated from the focus control unit,
   wherein the beams from the beamsplitter enter the solid immersion lens, and are then focused through the substrate onto the signal recording surface.

2. An optical pickup apparatus as recited in claim 1, wherein the objective lens system further comprises a condenser objective lens.

3. An optical pickup apparatus as recited in claim 1, wherein the distance between the collimated lens and the light source is changed by an amount of about L satisfying the following:

$$L=(f1/f2)2 \times (\Delta d/n)$$

where $\Delta d$ represents the deviation in the optical thickness of the substrate of the optical recording medium;
n represents a refractive index of the substrate; and
f1 and f2 represent focal lengths of the collimated lens and the objective lens system, respectively.

4. An optical pickup apparatus as recited in claim 1, wherein the light source is a laser diode.

5. An optical pickup apparatus as recited in claim 1, wherein the focus control unit detects focus errors by a detection method that is selected from beam size detection, astigmatism detection, knife-edge detection, and hologram-Foucault detection.

6. An optical pickup apparatus capable of compensating for thickness deviation of a high-density optical recording medium, the optical pickup apparatus recording or reproducing data from the optical recording medium that has a signal recording surface on a substrate, comprising:
   a light source generating and emitting light beams;
   a beamsplitter enabling a part of the emitted light beams to pass therethrough;
   an objective lens system, placed on an optical path between the beamsplitter and the optical recording medium, focusing the light beams from the beamsplitter, the objective lens system comprising a solid immersion lens which has a planar surface facing the substrate of the optical recording medium, with the substrate being interposed between the planar surface of the solid immersion lens and the signal recording surface;
   a light-receiving module receiving the light beam reficcied from tht optical recording medium and converting it into electrical signals;
   a focus control unit generating a focus control signal for focus control, in response to the electric signal from the light-receiving module;
   a position adjustment unit, connected to the light source, making the light source shift in response to the focus control signal generated from the focus control unit; and,
   an air gap control unit for maintaining a distance between the solid immersion lens and the optical recording medium, independent from the focus control signal generated from the focus control unit,
   wherein the beams from the beamsplitter enter the solid immersion lens, and are then focused through the substrate onto the signal recording surface.

7. An optical pickup apparatus as recited in claim 6, wherein the objective lens system further comprises a condenser objective lens.

8. An optical pickup apparatus as recited in claim 6, wherein the position of the light source is changed by an amount of about L2 satisfying the following:

$$L2=(s1/s2)2\times(\Delta d/n);$$

where $\Delta d$ represents the deviation in the optical thickness of the substrate of the optical recording medium;
n represents a refractive index of the substrate;
s1 represents an optical path length between the light source and the solid immersion lens; and
s2 represents an optical path length between the solid immersion lens and the optical recording medium.

9. An optical pickup apparatus as recited in claim 6, wherein the light source is a laser diode.

10. An optical pickup apparatus as recited in claim 6, wherein the focus control unit detects focus errors by a detection method which is selected from beam size detection, astigmatism detection, knife-edge detection, and hologram-Foucault detection.

11. An optical pickup apparatus as recited in claim 6, further comprising:
   a coupling lens, placed between the light source and the beamsplitter, enabling optical power of the objective lens system to be distributed,
   wherein the position adjustment unit is connected to the coupling lens.

* * * * *

UNITED STATES PATENT AND TRADEMARK OFFICE
CERTIFICATE OF CORRECTION

| | | |
|---|---|---|
| PATENT NO. | : 7,483,345 B2 | Page 1 of 1 |
| APPLICATION NO. | : 10/505470 | |
| DATED | : January 27, 2009 | |
| INVENTOR(S) | : Tae-Sun Song | |

It is certified that error appears in the above-identified patent and that said Letters Patent is hereby corrected as shown below:

On the Title Page:

At field (57), line 8, "mating" should be -- making --.

In the Claims:

At Column 8, line 21, "reficcied" should be -- reflected --.

Signed and Sealed this
Fourteenth Day of June, 2011

David J. Kappos
*Director of the United States Patent and Trademark Office*